United States Patent [19]

Yamada

[11] Patent Number: 5,165,256
[45] Date of Patent: Nov. 24, 1992

[54] FOOD FREEZER WITH JET AGITATOR

[75] Inventor: Yoshio Yamada, Higashiyamato, Japan

[73] Assignee: Technican Co., Ltd., Tokyo, Japan

[21] Appl. No.: 644,585

[22] Filed: Jan. 23, 1991

[30] Foreign Application Priority Data

Sep. 10, 1990 [JP] Japan .................. 2-236971

[51] Int. Cl.$^5$ ............................................. F25D 17/02
[52] U.S. Cl. ................................. 62/373; 62/70; 62/383
[58] Field of Search ............. 62/62, 64, 68, 69, 70, 62/373, 376, 383

[56] References Cited

U.S. PATENT DOCUMENTS

| | | | |
|---|---|---|---|
| 3,007,319 | 11/1961 | Ogden | 62/376 |
| 3,868,828 | 3/1975 | Schwartz | 62/376 |
| 4,388,814 | 6/1983 | Schilling | 62/383 |
| 4,715,195 | 12/1987 | Kucza | 62/376 |

FOREIGN PATENT DOCUMENTS

| | | |
|---|---|---|
| 174170 | 3/1986 | European Pat. Off. . |
| 59-28388 | 7/1984 | Japan . |
| 59-28389 | 7/1984 | Japan . |
| 60-54025 | 11/1985 | Japan . |
| 60-54026 | 11/1985 | Japan . |
| 61-29690 | 7/1986 | Japan . |
| 61-53023 | 11/1986 | Japan . |
| 62-3736 | 1/1987 | Japan . |
| 88-03251 | 5/1988 | World Int. Prop. O. . |

*Primary Examiner*—Ronald C. Capossela
*Attorney, Agent, or Firm*—Keck, Mahin & Cate

[57] ABSTRACT

The present invention is a method for producing refreshable frozen foods, such as meat and other food. The method is suitable for freezing foods by dipping foods in an agitating jet flow of a liquid anti-freezing medium, such as ethyl alcohol, under a temperature which is controlled between −30° C. and −50° C. so as to have refreshable foods which may be restored to an original fresh raw state by defrosting. In the method a super rapid freezer thereof.

2 Claims, 9 Drawing Sheets

FIG_1

FIG_2

FIG_7

FIG_8

FIG_9

FIG_10

FIG_11

FOOD FREEZER WITH JET AGITATOR

BACKGROUND OF THE INVENTION

1. Field of the Invention The present invention relates to a method for producing refreshable frozen foods. The method is suitable for freezing foods in a liquid anti-freezing medium so as to have refreshable foods which can be restored to an original fresh raw state by defrosting. A super rapid freezer is used in the method.

2. Related Art Statement

Cold air has hitherto been used as a cold medium for freezing and preserving foods such as edible meats, fish and vegetables and the like, and a freezing system with the cold air or nitrogen gas has been used.

Figure 11:
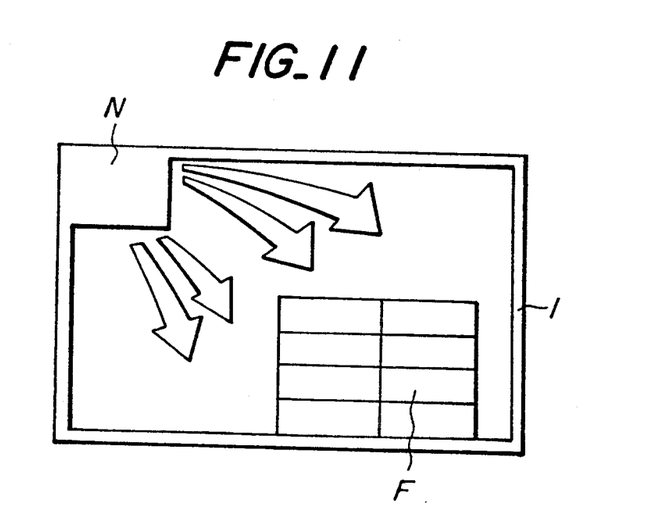
FIG. 11 is an explanatory view of a cold air freezing method and its freezer showing the freezing condition by cold air in the prior art.

The prior method for freezing edible meat and the freezer thereof, as shown in FIG. 11, uses a freezing system with cold air by housing a food F within a sealed freezing chamber 1. Cold air N is sprayed at the food F in the direction of the arrows.

According to this system, when edible meat is frozen, there are such disadvantages that the condition of frozen meat is worse, drippings are produced when defrosting, and components of meat flow out together with blood, thereby lowering the taste of edible meat. Moreover, food is frozen by a cold air flow at super low temperature, such as $-20°$ C. to $-40°$ C., so that uneven freezing is produced at a deep side, a side surface, a bottom portion and the like of a food where a cold air flow cannot directly be made to contact with the food.

Freezing quality of a food depends upon how quick the food is passed through the maximum freezing forming zone (i.e. $-1°$ C. to $-10°$ C.) of a food to be frozen.

A frozen crystal of water in frozen meat largely breaks cells at slow freezing. As a result, dripping is liable to be caused and the components of meat which keeps freshness and flavor are lost at the time of defrosting. Also, the degree of freshness and the flavors are deteriorated, and decomposition is accelerated by adherence of various germs to the meat.

Japanese Laid-open Patent Application No. 3,736/87 discloses a process for quickly freezing sea food. A device for carrying out this process comprises an agitating shaft, freezing piping and a basket for housing meat or sea food within a tank. A motor and a compressor are provided outside the tank. The process includes the steps of cooling brine, adding oil to a solution consisting of propylene glycol, potassium chloride and water, and immersing and freezing sea food in the brine. Such a freezing process is known.

SUMMARY OF THE INVENTION

The present invention aims to obviate the shortcoming of the prior art and to provide a method for freezing foods at a super rapid freezing rate and a freezer thereof by accurately controlling a freezing temperature at $-30°$ C. to $-50°$ C. and a freeze-dipping time of foods of at 30~120 minutes, freezing within a short time, maintaining and not lowering quality, freshness, taste, and flavors of frozen and more specifically frozen meat after defrosting.

A object of the present invention is to provide a method for freezing foods according to the present invention which comprises the steps of uniformly cooling an anti-freeze medium of an aqueous solution of ethyl alcohol of a secondary cooling medium by a stainless steel freezing coil tube circulating the first cooling medium and provided within a sealed anti-freeze medium tank, jet-agitating this cooled anti-freeze medium by a jet-agitator, dipping foods in an agitating jet flow of this cooled anti-freeze medium, controlling a temperature of the cooling medium within $-30°$ C. to $-50°$ C. by a temperature sensor, and uniformly freezing the foods at a super rapid freezing rate.

Another object of the present invention is to provide a super rapid food freezer comprising an anti-freeze medium tank filled with an anti-freeze medium, a freezing coil tube made of stainless steel and disposed in the vertical direction along at least three inner wall surfaces of the tank, a jet-agitator provided in another inner wall surface of said tank together with temperature sensor, a food lifting device provided at the upper portion of the tank, and a sealed heat insulating lid resiliently supported, by the lifting device. An opening portion of the tank is airtightly closed or opened by the sealed heat insulating lid, and the food is also freely dipped in or out of the anti-freeze medium of the tank and the food uniformly frozen at a super rapid cooling rate by dipping into the anti-freeze medium. The super rapid food freezer further comprises a jet tube having a jet inlet and a jet outlet for an anti-freeze medium, a jet screw type jet-agitator provided with a screw in the jet tube so as to jet-agitate the cooled anti-freeze medium and guide the jet flow by a jet guiding tilting plate provided at the jet outlet for jetting the anti-freeze medium in the jet agitator. The food freezer further includes a basket for housing food on a stainless steel backing perforated plate supported by a lifting frame of lifting device, a hydraulic cylinder device for actuating the lifting device, and a sealed insulating lid resiliently supported by a supporting arm fixed to the lifting frame, whereby the opening portion of the tank is freely closed air tightly or opened by the lid. The super rapid food freezer further comprises a food lifting device for freely dipping or taking out the food from the anti-freeze medium of the tank.

An object of the present invention is to provide a freezing method for obtaining frozen edible or refreshable meat or food which is uniformly frozen at a super rapid cooling rate within a short time or easily defrosted by regulating a temperature of an anti-freeze medium by a temperature sensor, uniformly cooling the anti-freeze by a freezing coil tube, and dipping the refreshable meat or the food in the cooled anti-freeze jet flow circulated within a anti-freeze medium tank.

Another object of the present invention is to provide a freezer which is able to uniformly cool an anti-freeze medium by the aid of a freezing coil tube arranged vertically along the inner wall of an anti-freeze medium tank, to cool the anti-freeze medium by a jet of a jet-agitator, and to uniformly freeze the refreshable meat or the food at a predetermined temperature with good freezing efficiency. Further, another object of the present invention is to provide a freezer in which the refreshable meat or food can easily be taken out by housing a meat or food to be frozen in a basket, placing the basket on a perforated backing plate or a lifting frame of a food lifting device, lowering the lifting frame by operating a control device, easily dipping the food in an anti-freeze medium, closing and sealing an opening portion of an anti-freeze medium tank by a sealed heat insulating lid, completing freezing, and raising the lifting frame.

BRIEF DESCRIPTION OF THE DRAWINGS

For a better understanding of the invention, reference is made to the accompanying drawings, in which.

Throughout different drawing figures, 1 is an air tightly sealed freezing chamber, 2 is a tank filled with an anti-freeze medium, 3, 4 and 5 are a freezing coil tube, 6 is a stainless steel backing perforated plate, 7 is a lifting frame, 8 is a sealed heat insulating lid, 9 is a supporting arm, 10 is a screw rod, 11 is a spring, 12 is a lifting plate, 13 is an oil pressure cylinder chamber, 14 is a motor of an oil pressure cylinder, 16 is an oil pressure cylinder device, 17 is a piston rod, 18 is a telescopic tube, 19 is a connection body, 20 is a guiding axis, 21 is a screw, 22 is a screw axis, 23 is a jet flow tube, 24 is an inlet of jet flow, 25 is an outlet of jet flow, 26 is a jet flow guiding tilted plate, 27, 28, 29, 30 are an inner wall of anti-freeze medium tank, 31 is a heat insulating layer, 32 is a basket, 33 is a jet-agitator, 34 is a control device, 35 is a switching button, 36 is a freezing compressor, 37 is a jet flow agitator and a temperature sensor chamber, 38 is a temperature sensor, 39 is a strainer, 40, 41 are a pressure valves, 42 is an opening portion of the anti-freeze medium tank, 43 is a defect portion of sealed heat insulating lid, 44 is an opening of oil pressure cylinder device chamber, 45 is a motor for screw, 46 is a motor supporting cylindrical frame, 47 is a die stand, 48 is a die wheel, C is a compressor unit, E is an anti-freeze medium, F is a food to be frozen, H is a header, L is a food lifting device, N is cooled air, P is a freezing medium path and V is a valve.

DESCRIPTION OF THE PREFERRED EMBODIMENTS

The invention will now be described in further detail by referring to a preferred embodiment thereof which is schematically shown in the accompanying drawings.

A method for freezing foods according to the invention is characterized in that an anti-freeze medium (i.e. brine) E of an ethyl alcohol aqueous solution of a secondary cold medium is uniformly cooled by stainless steel freezing coil tubes 3, 4 and 5 within a sealed anti-freeze medium tank 2. The thus cooled anti-freeze medium E is agitated by jet flow of a jet-agitator 33, a food F is dipped in an agitating jet flow of this cooled anti-freeze medium E, a temperature is controlled by a temperature sensor 38, and the food is uniformly frozen at a super rapid cooling rate.

Figure 10:
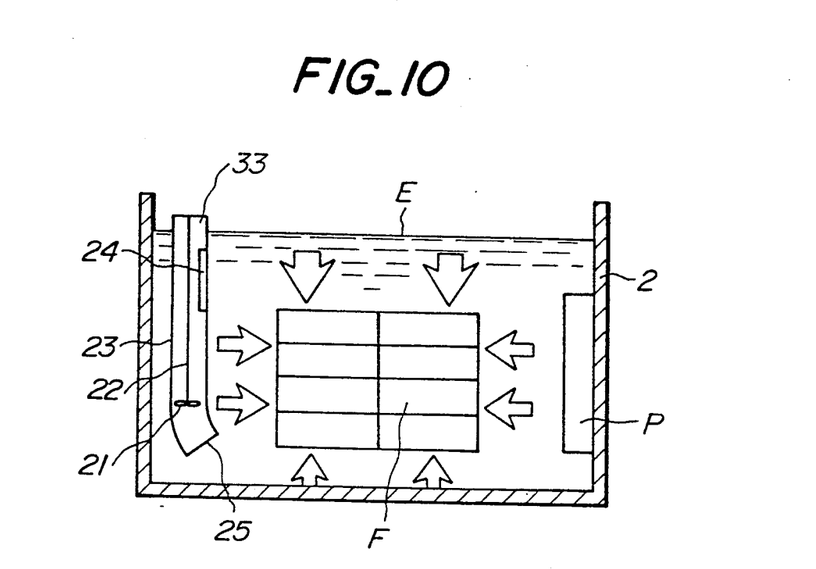
FIG. 10 is an explanatory view showing the liquid freezing condition of the present invention.

A method for freezing foods according to the invention as shown in FIG. 10, can freeze the food under preferable conditions within a short time from the direction of an arrow by jet-agitating the cooled anti-freeze medium E of an ethyl alcohol aqueous solution in the anti-freeze medium tank 2, by a jet-agitator 33 having a screw 21 for circulation, and dipping the food, such as refreshable edible meat F, in the cooled anti-freeze medium E.

Figure 4:
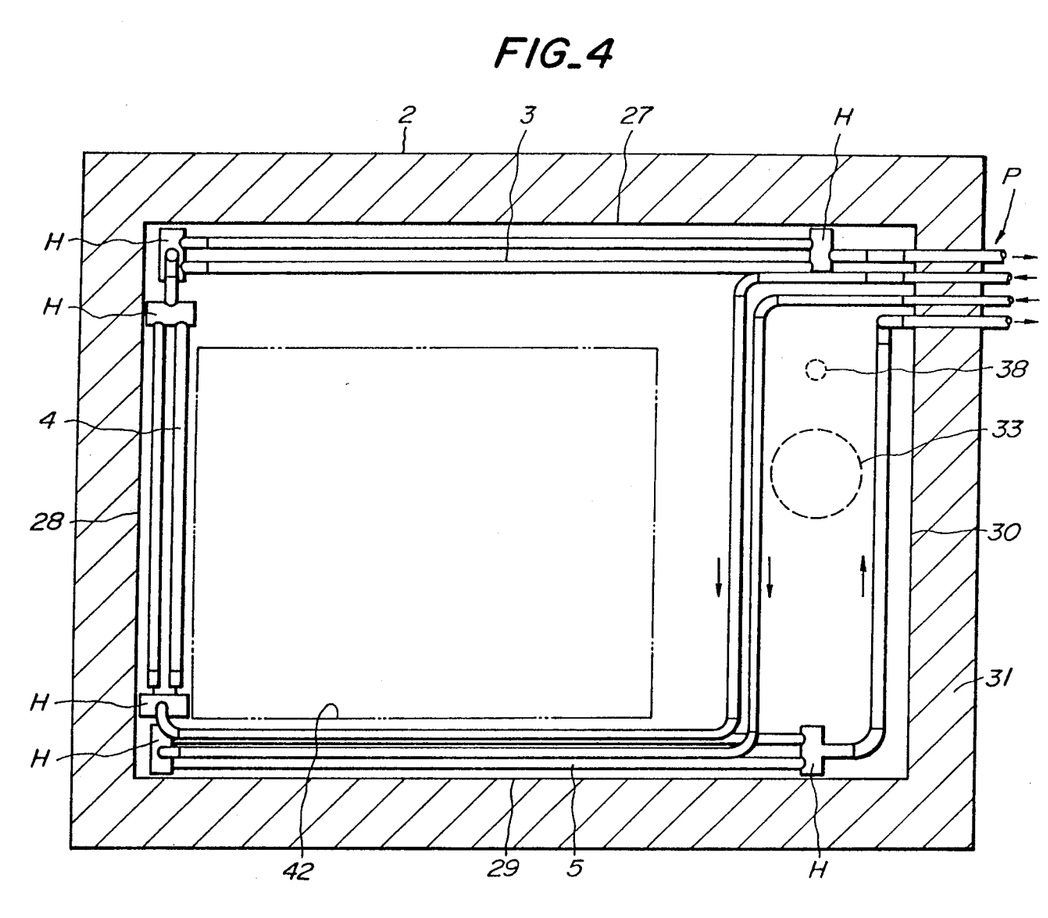
FIG. 4 is a cross-sectional top view of a freezing tank filled with anti-freezing medium for and showing freezing coil tubes.

In this case, a freezing tube path P, for uniformly freezing the refreshable edible meat F, is provided in the vertical direction along three directional inner surface walls 27, 28 and 29 of the anti-freeze medium tank 2, such as stainless steel coil tubes 3, 4 and 5 shown in FIG. 4, and two rows of the path P are provided at every inner wall surface. The anti-freeze medium E, cooled by the freezing tube path P, cools the food F by circulating and jetting from the direction of an arrow, as shown in FIGS. 8, 9 and 10, by means of the jet flow-agitator 33 of a jet screw pump type.

The jet flow-agitator 33, as shown in FIGS. 5, 6, 8 and 9, has a jet tube 23 and a screw 21 fixed to a screw shaft 22 driven by a motor 45, and the anti-freeze medium E is circulated and jetted within the anti-freeze medium tank 2 from a jet inlet 24 of the jet tube 23 through a jet outlet 25 by rotation of the screw 21. The refreshable edible meat or the food is uniformly frozen in the cooled anti-freeze medium E by this jet. During this period, a temperature of the anti-freeze medium E is measured by the temperature sensor 38, and the temperature and dipping time are controlled by an electric control device 34. The jet tube 23 and the temperature sensor 38 are fixed to the anti-freeze medium tank 2, and the motor 45 is fixed to a supporting cylinder 46 fixed to the upper portion of the jet tube 23.

Figure 8:
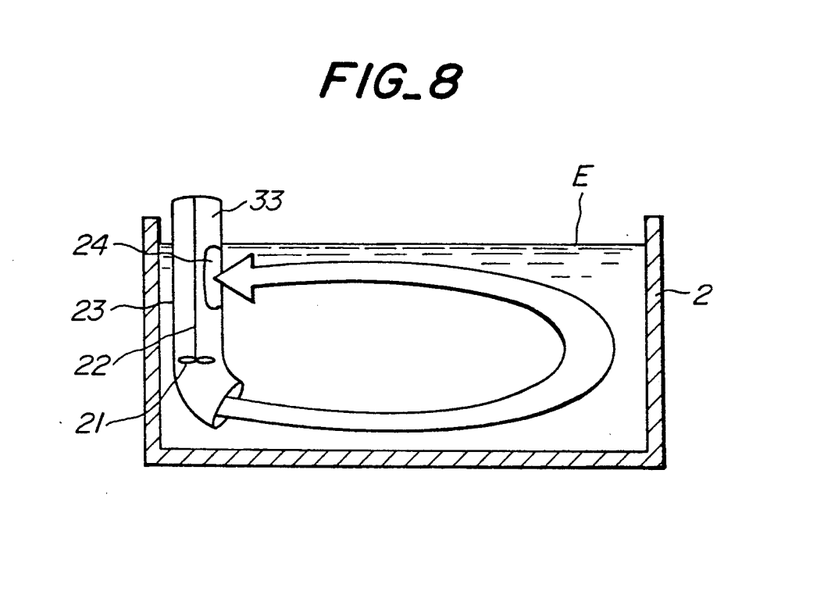
FIG. 8 is an explanatory view showing the jet flow agitating condition of a jet screw pump.
Figure 9:
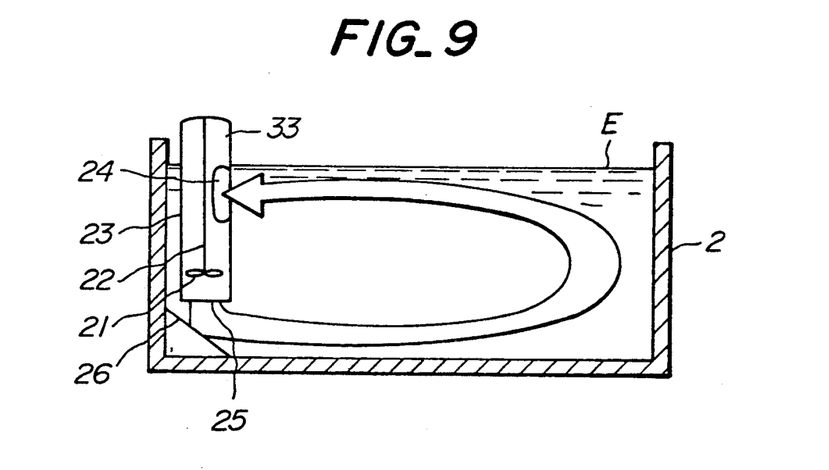
FIG. 9 is an explanatory view of another embodiment showing the jet flow agitating condition of the jet screw pump.

The jet outlet 25 of the jet tube 23 shown in FIG. 8 is curved and directed in the direction of a jetting flow, but the jet tube 23 shown in FIG. 9 guides the direction of a jet flow by a jet guiding tilting plate 26 provided at the bottom of the anti-freeze medium tank 2, so that either structure can be employed.

The temperature of an anti-freeze medium within the anti-freeze medium tank becomes equal by jet flow agitating of the jet agitator.

In order to uniformly freeze a food to be frozen within a short time, it is important to cause no unevenness of the temperature of an anti-freeze medium. A uniform temperature of the anti-freeze medium within the freezer becomes possible by jet agitation by means of a jet screw pump type jet agitator.

Since the jet screw pump is made of stainless steel, it is excellent in durability and anti-corrosion, and very hygienic.

The temperature sensor 38, as shown in FIGS. 2-4 and FIG. 6, is lowered from the jet agitator and the temperature sensor chamber 37 into the anti-freeze medium tank 2, and electrically connected to the control device 34, so as to make temperature control possible. The temperature change of the anti-freeze medium and the temperature of food to be frozen can be controlled by the temperature sensor.

An anti-freeze, medium, used in a secondary cold medium liquid, is preferably a colorless innoxious ethyl alcohol forming a freezing liquid used as a food additive. Additionally, use may be made of the liquid of sodium chloride, magnesium chloride, calcium chloride, glycerine, propylene glycol, ethylene glycol, and the like as an anti-freeze medium.

In the invention, the whole food is wrapped for dipping into an anti-freeze medium at an ultralow temperature (i.e. $-30°$ C. to $-50°$ C.), so that it is possible to cool the food to be frozen from every direction and to uniformly freeze it without any unevenness. Moreover, the anti-freeze liquid medium is far better than air in thermal conductivity, so that it quickly passes through the maximum freezing point ($-1°$ C. to $-10°$ C.) of the food, and hence, quick freezing by liquid is effective so as to avoid damage due to slow freezing.

The freezing method of the invention can apply a super rapid freeze to the food at a comparative equalized temperature, so that the temperature difference between the outside and the center portion of the food is small, and thereby the osmotic pressure difference is small. As a result, cracks are hardly produces on the surface of the food.

In the super rapid liquid freezing according to the present invention, no dripping during defrosting is made due to the super rapid freezing. In the case of freezing with the use of a retainer type stainless steel case for, freezing adhered meat (to reform the meat as one unitary piece by using small, broken pieces of meat by using this retainer), it is preferable to recycle by repetitively using this case.

According to the invention, the frozen condition of meat or food is good, and any kind of defrosting process is available. Therefore, air, water and the like can be used.

A freezing method provided by the use of the liquid cold medium according to the invention produces extremely highly efficient thermal conductivity, excellent freezing conditions as compared with other freezing methods in the prior art, excellent workability, freezing conditions, equipment cost, total cost and the like.

An example of the refreshable food freezer according to the invention is further explained by referring to the accompanying drawings in detail.

As shown in FIGS. 1-7 the refreshable food freezer of the invention is formed by arranging stainless steel freezing coil tubes 3, 4 and 5 on three wall surfaces in two rows in the vertical direction along each of the inner wall surfaces 27, 28, 29 in three directions of the inner wall of an anti-freeze medium tank 2 filled with an anti-freeze medium (i.e. brine) E, providing a jet agitator 33 and a temperature sensor 38 along an inner wall surface in the other one direction, installing a food lifting device L at the upper portion of the anti-freeze medium tank 2, resiliently supporting a sealed insulating lid 8 by the lifting device L, air tightly and freely closing and opening an opening portion 42 of the anti-freeze medium tank 2 by the sealed heat insulating lid 8, freely dipping in or taking out a food F from the anti-freeze medium tank 2, and uniformly freezing the food F at a super rapid cooling rate.

The anti-freeze medium tank 2 is a stainless steel tank filled with liquid cold medium and provided with a heat insulating layer 31, the upper surface of which is provided a control device 34, a jet agitator a temperature sensor chamber 37, and the rear surface of which is provided an oil pressure cylinder device chamber 13 of a lifting device L, and which is further provided with machinery facilities and electric devices such as a compressor unit C. A fixing leg stand 47 and a moving leg wheel 48 are provided at the bottom portion of the anti-freeze medium tank 2.

Figure 5:
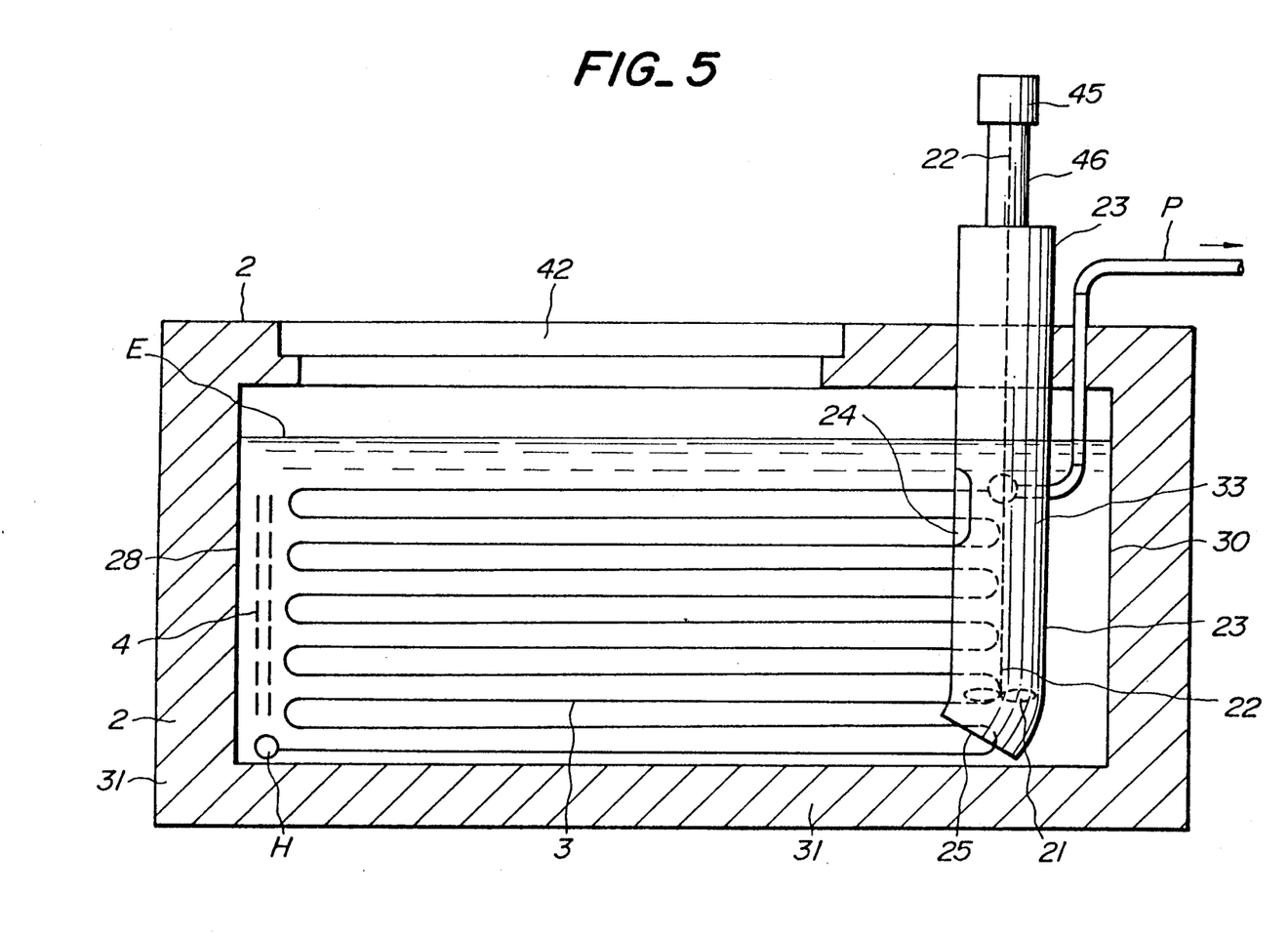
FIG. 5 is a cross-sectional front view and showing a jet-agitator.
Figure 6:
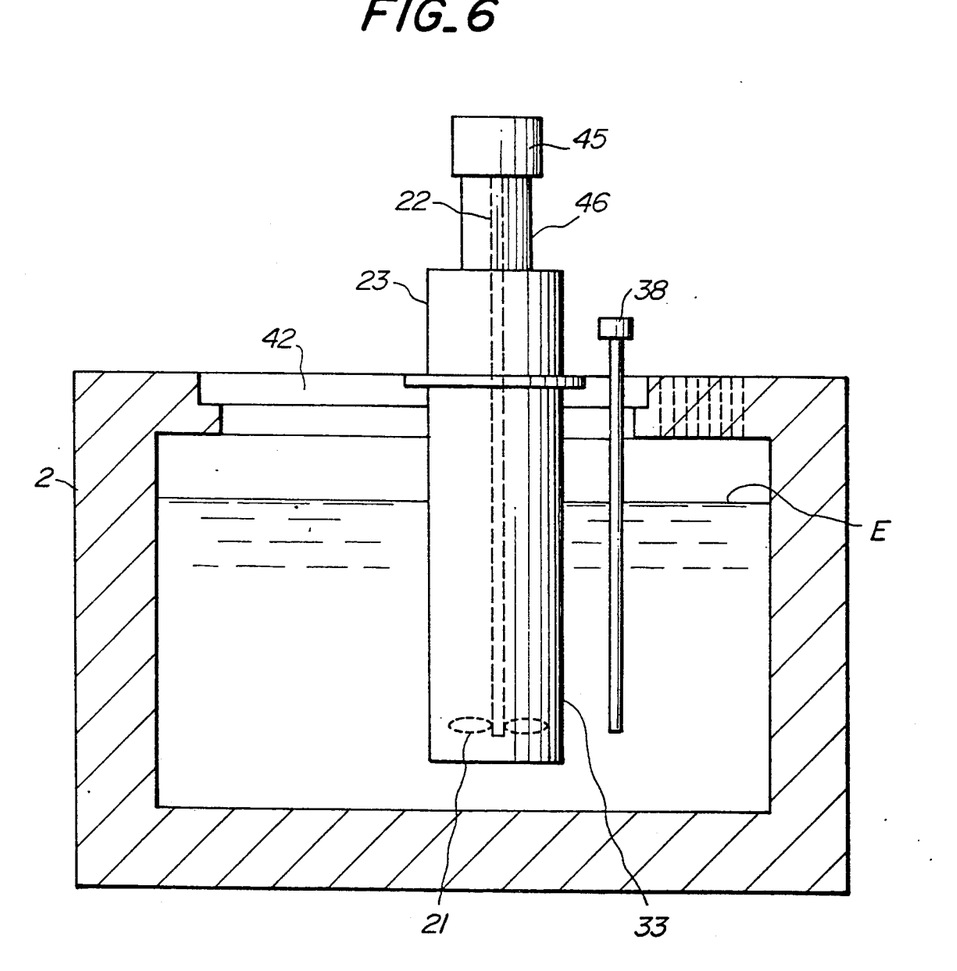
FIG. 6 is a cross-sectional side view showing a jet-agitator and a temperature sensor.
Figure 7:
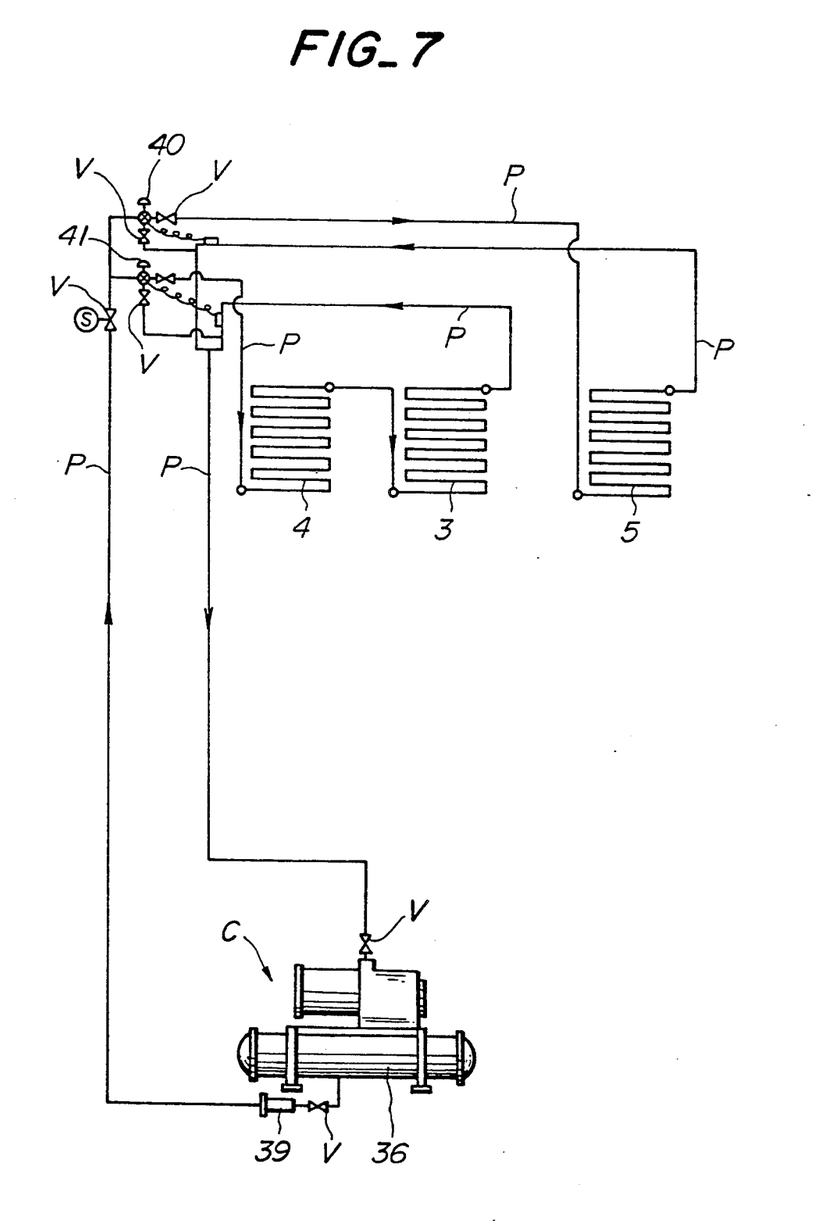
FIG. 7 is a schematic diagram of pipeline of a freezer.

A pipeline of the freezer is explained by referring to FIGS. 4, 5 and 7.

In FIG. 7, the compressor unit C has a freezing compressor 36, a strainer 39, a valve V and the like, and this compressor unit C and each freezing coil tube 3, 4, 5 are connected as a pipeline P by connecting through pressure valves 40, 41, and a valve V, a header H.

Figure 1:
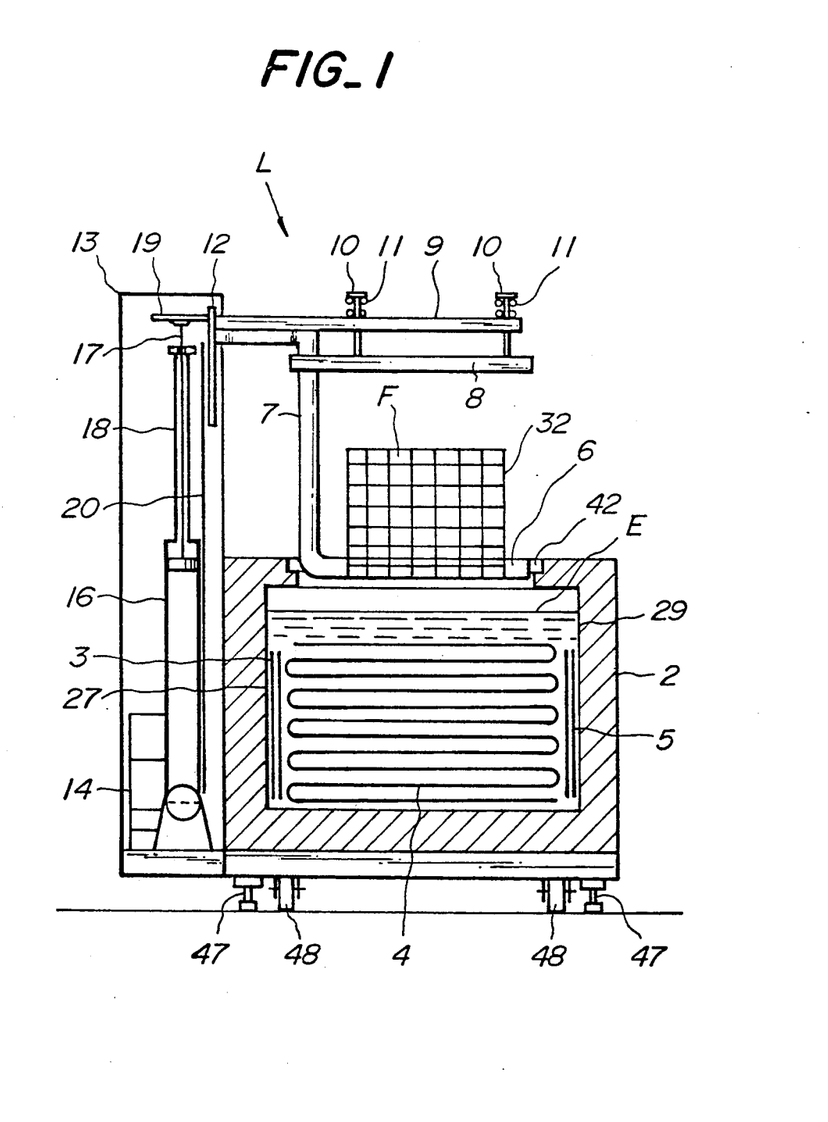
FIG. 1 is a side view of a freezer with a control device, a jet agitator and a temperature removed.
Figure 2:
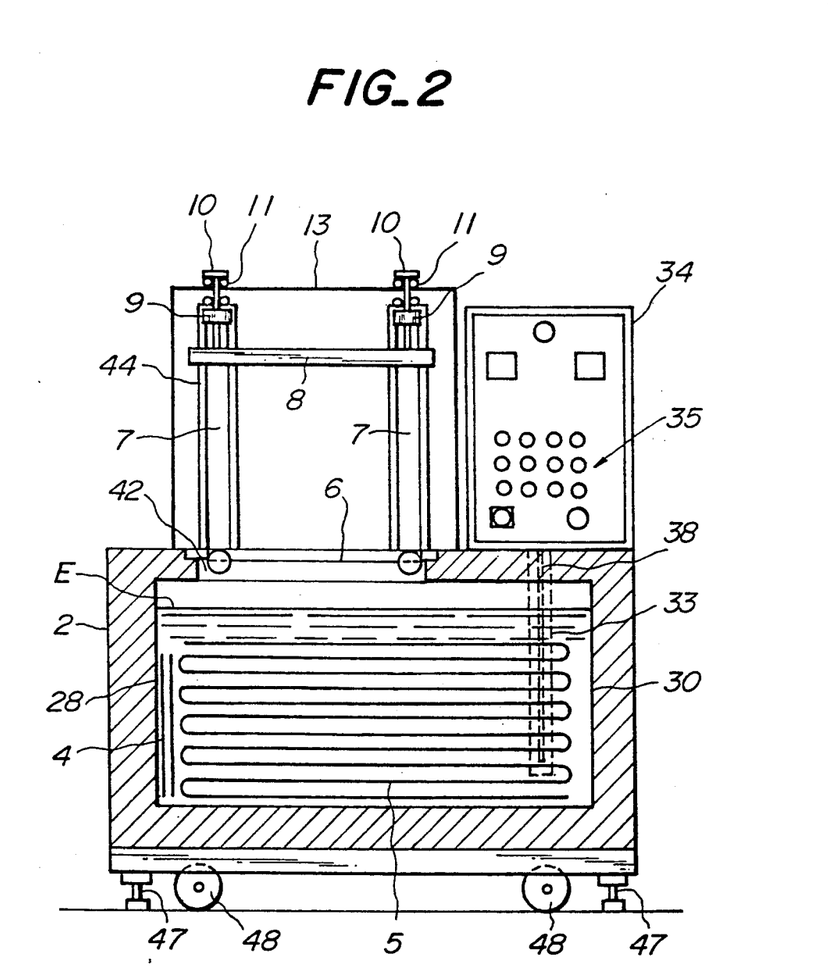
FIG. 2 is a front view of the freezer.
Figure 3:
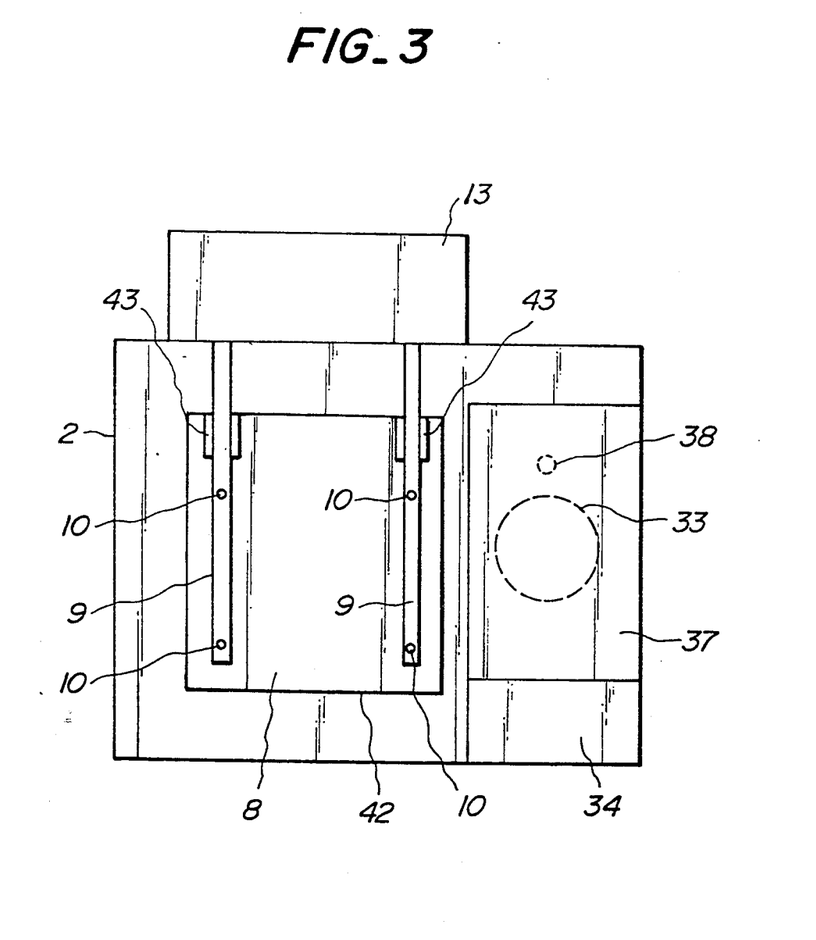
FIG. 3 is a plan view of the freezer of FIG. 2.

A food lifting device is explained by referring to FIGS. 1 to 3.

The food lifting device L has a construction of dipping in and taking out food F in the anti-freeze medium tank 2 by placing a basket 32 for housing food on a stainless steel perforated backing plate 6 of a lifting frame 7 lifted by an oil pressure cylinder device 16 mounted on an oil pressure cylinder device chamber 13, resiliently supporting a sealed heat insulating lid 8 by a pair of supporting arms 9, 9 fixed to the lifting frame 7, and freely opening and closing an opening portion 42 of the anti-freeze tank 2 by the sealed insulating lid 8.

The piston 17 is telescopically moved by the oil pressure cylinder device 16. The lifting frame lifts a basket 32 and a sealed heat insulating lid 8. The meat or the food 32 is placed on he perforated backing plate 6 in the basket 32 of the lifting frame 7 and lowered for dipping into the anti-freeze medium tank 2. After completely freezing, the lifting frame lifts the meat or the food from the anti-freeze medium and takes it out from basket for defrosting. The lifting plate 12 moves along a guide shaft 20 fixed to the oil pressure cylinder device chamber 13. The oil pressure cylinder device 16 is provided with a telescopically movable cylinder 18 together with the piston 17. An opening portion 44 of the oil pressure cylinder device chamber 13 is formed as an opening for lifting the lifting frame 7.

The heat insulating lid 8 is fixed to a screw lever 10 penetrated through the supporting arm 9, and resiliently supported by interposing a spring 11 between the screw lever 10 and the supporting arm 9. A recess portion 43 of the heat insulating lid 8 is formed to pass the lifting frame 7 therethrough.

The food F is placed on the lifting device L, the lifting frame 7 is automatically lowered by one-touch operation of a switch button 35 of the control device 34, and at the same time, the opening portion 42 of the anti-freeze medium tank 2 is air tightly closed by the heat insulating lid 8 supported by a resilient device consisting of supporting arms 9, 9, screw lever 10 and spring 11, and freezing is started as a temperature change of the anti-freeze medium and a freezing temperature of the food are measured by the temperature sensor 38. After the food to be frozen within the anti-freeze medium is frozen at a constant temperature, it is determined to be frozen by automatically raising the lifting frame 7, opening the opening portion 42 of the anti-freeze medium tank by the heat insulating lid 8 and simultaneously sounding a buzzer.

According to the invention, the lifting device can automatically be raised or lowered by one-touch operation and the basket 32 housing the food therein can smoothly and promptly be taken in and out because the whole machine is placed low and controlled by computer operator. Moreover, since the bottom space is wide, cleaning is easy, design is hygienic and the like.

The area in which the invention is applicable, other edible meat, include areas concerning sea food, edible birds, fruit to be frozen in refreshable state.

According to the method for freezing refreshable meats or other foods and the freezer of the invention, because of super rapid freezing, the freezing condition of frozen meat or other food is very good, the change of food cells and breakdown of systems are very few, and no dripping is caused at the time of defrosting. Therefore, it is not necessary to defrost in a special defroster, and the food is refreshed to the original fresh condition after defrosting, so that no defrosting means is selected. Super rapid freezing does not break cells, so that conventional refrigeration and defrosting are available. When a raw food product is frozen, the product is refreshed to almost the original fresh condition after freezing and defrosting.

In the prior method, it takes 24 hours in a case of the prior cold air freezing, while according to the invention the freezing time can be shortened to only 30 minutes by ultrarapid freezing. Thus, the quality, freshness and taste of a food, particularly meat, can be frozen as they are in refreshable state, in a short time, defrosting is easy, and the invention can make a tremendous contribution to food processing industry.

EXAMPLE 10.8 kg of beef round (15 cm in thickness) was quickly frozen from room temperature to −30° C. −50° C. for 90 minutes. This frozen state according to the liquid freezing of the present invention is compared with that of nitrogen gas freezing. The time of nitrogen gas freezing requires 7-8 hours, while the freezing time of present invention requires only 90 minutes.

In comparison with slow freezing, which requires about 24 hours, super rapid freezing according to the present invention only requires about 90 minutes, and the invention is remarkably effective for lowering costs.

|  | Freezing temperature | Freezing time | Result |
| --- | --- | --- | --- |
| Present invention | liquid −30° C.∼ −50° C. | 1.5 hr–2 hr. (90 min–120 min) | −38° C.∼−42° C. no drip flow |
| Nitrogen gas rapid freezing | gas/−100° C. | 7–8 hr | dripping flow out even with packing after freezing, surface becomes dry by cracking |
| Slow freezing | gas −30° C.∼ −40° C. | 24 hr | larger dripping flow out even with packing after freezing, surface becomes dry by cracking |

The freshness and flavor of frozen foods after defrosting are most influenced by the cooling rate for freezing and dipping time.

Freezing foods depends on how fast the temperature at which foods freeze can be transferred through the food to be frozen. When the food is slowly frozen, frozen crystals of moisture content from the frozen item enlarge and cause the cell destruction. Therefore, at the time of defrosting, the food tends to produce drippings that include important components of the food, and as a result, contains less freshness and flavor. The liquid freezing method has solved these problems with three unique features.

Three great features of the super rapid liquid freezer lift type according to the present invention are as follows.

(1) Microcomputer loaded lift type automated system

A built-in microcomputer integrates the temperature change of the freezing liquid and the freezing point (temperature) of the food or meat to be frozen. The meat or food to be frozen is then loaded on a lift. The lift descends just by a touching movement at the same time that a flexible arm device closes the freezer lid and then the freezing process starts. After the food or meat to be frozen is frozen in the freezing liquid at a fixed temperature, the flexible arm device automatically opens the freezer lid while the lift ascends and a buzzer goes on to inform us of the completion of freezing.

(2) The jet screw pump mixes the freezing liquid inside the freezer to keep its temperature even.

The critical point to follow in freezing foods evenly in a short period of time is not to allow uneven temperature in the freezing liquid. The jet screw pump makes possible the even distribution of temperature by mixing the freezing liquid inside the freezer.

(3) High speed cooling of the freezing liquid with a special cooler

Two special coolers are equipped on the right and left sides inside the freezer using 3 rows and 10 levels of SVS:T:Stainless plate fins. After completing the freezing of the foods, they perform the rapid lowering of the freezing liquid in order to regain immediately its fixed temperature.

Differences in freezing methods between cold air freezing and liquid freezing according to the present invention are as follows.

In cold air freezing method (1) Food is frozen by the flow of cold air at a super low temperature.

(2) Cold air does not easily reach the back part or side of the food directly, resulting in slow freezing.

(3) More than 24 hours are required due to slow freezing.

(4) More time to deposit is required as it tends to produce drippings.

In liquid freezing method (1) Liquid at a super low temperature (−50° C.) wraps the overall food, and thus can freeze it from every direction without causing unevenness.

(2) As liquid has a far better heat conductivity than air, it more quickly reaches the freezing point of the food and can avoid slow freezing.

(3) As the liquid, can accumulate 2,000 to 3,000 times more heat than the same amount of air does, it can steadily cope with a rapid load change, or cool something with a high temperature.

The safety and merits of liquid freezer lift type according to the present invention, are as follows.

(1) Freezing liquid medium is colorless and harmless in terms of food hygiene and is permitted by the Ministry of Welfare (2) There is no need to touch directly the freezing liquid as operations are automated.

(3) A very hygienic machine, made of only stainless steel that has durability and corrosion resistance qualities, is used.

(4) Very few drippings after defrosting are present (5) Because of super rapid freezing, the retainer can be recycled better than existing types in the prior art.

(6) Good freezing conditions only require normal defrosting methods.

(7) The super rapid liquid freezer requires only 30∼120 minutes, comparing with 24 hours usually required in the prior art.

What is claimed is:

1. A food freezing comprising:

a dip tank filled in a refrigerant to form an anti-freeze bath, stainless steel freezing coil tubes disposed in a vertical direction along three inner wall surfaces of said dip tank for maintaining a suitable freezing temperature between $-30°$ C. and $-50°$ C., a jet-agitator provided along a fourth inner wall surface of said dip tank, a temperature sensor provided in said dip tank for sensing when said refrigerant is at a temperature between $-30°$ C. and $-50°$ C. so as to cool food at a super rapid cooling rate within said refrigerant.

a food lifting device provided at an upper portion of the dip tank, a sealed heat insulating lid resiliently supported by the food lifting device, an opening portion of the dip tank being freely air tightly closed or opened by the heat insulating lid, a jet tube provided with a jet inlet and a jet outlet for said refrigerant, and a jet flow guiding tilting plate provided at the jet outlet, said jet agitator being a jet screw pump type jet agitator provided with a screw in the jet tube, the refrigerant being jet agitated, the food being freely dipped in or withdrawn out of the dip tank and uniformly frozen at a super rapid cooling rate for freezing within the refrigerant.

2. A food freezer as claimed in claim 1, wherein said food lifting device comprises a lifting frame, and further comprising a basket for housing food placed on a stainless steel perforated backing plate of said lifting frame, an oil pressure cylinder device for lifting said lifting frame, and a supporting arm, fixed to the lifting frame, resiliently supporting said heat insulating lid, the opening portion of the dip tank being freely air tightly closed or opened by the heat insulating lid, said food lifting device freely dipping the food in or withdrawing the food out of the dip tank.

* * * * *